April 26, 1927.
R. H. MURRAY
1,625,905
LIGHT REFLECTING DEVICE OR UNIT
Filed April 5, 1926
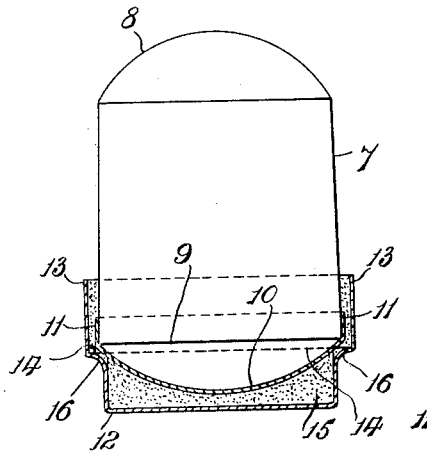
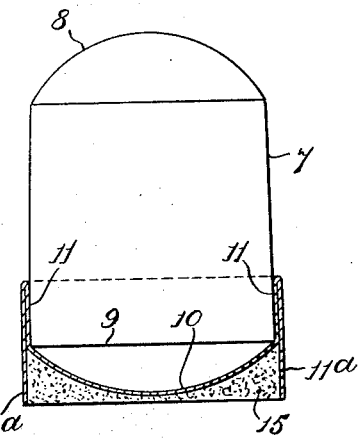
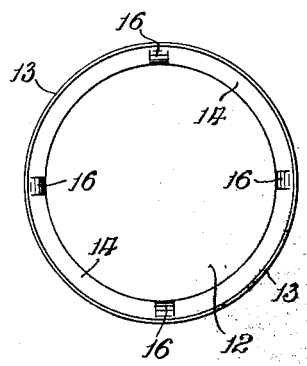
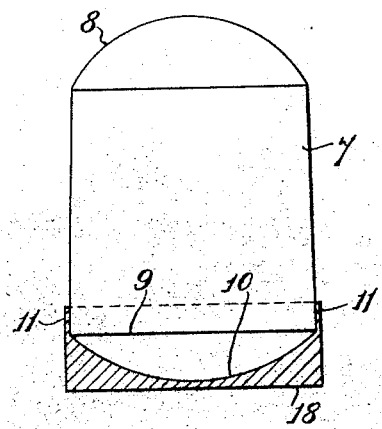
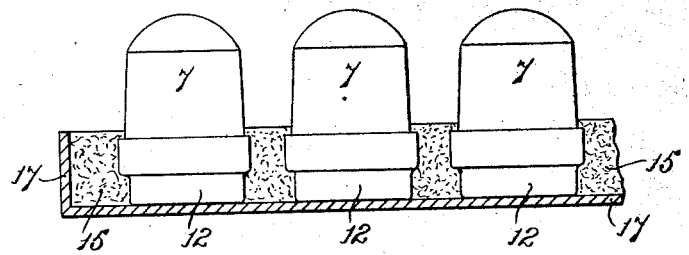

Patented Apr. 26, 1927.

1,625,905

UNITED STATES PATENT OFFICE.

RICHARD HOLLINS MURRAY, OF MANCHESTER, ENGLAND.

LIGHT-REFLECTING DEVICE OR UNIT. REISSUED

Application filed April 5, 1926, Serial No. 99,776, and in Great Britain January 22, 1926.

The invention has reference to light-reflecting devices or units of the type comprising a plano-convex lens and a concave reflector arranged behind the plane rear surface of the lens. Such devices are commonly used in the construction of road indicators and other signs which at night are illuminated or rendered visible by the reflection of light coming from the lamps of motor vehicles or some other extraneous source. In many instances such indicators or signs are made up from a plurality of such units or devices arranged in some predetermined order. Devices of this nature may also be used for buoys or beacons and other such similar guides used in navigation, as in such uses they would indicate a well defined course or clearly indicate a docking place.

The invention has for its object to provide improvements in light-reflecting devices or units of the type referred to, whereby to facilitate the fitting and/or grouping of the same in frames or holders, and also to protect the reflectors against accidental damage.

A light reflecting device or unit of the type referred to, according to the invention, is provided with a base or cap upon which the device or unit may be stood while being fitted in a frame or holder and which also serves as a protector to the reflector.

Further, according to the invention, the plane rear surface of the lens is ground and polished, whilst where the base or cap is separate from the reflector, the intervening space between the latter and said base or cap is or may be fitted with a suitable plastic material adapted to harden after the base or cap has been fitted.

In the accompanying drawings Fig. 1 is a sectional elevation of one form of reflecting unit in accordance with the invention, and Fig. 2 is a plan of the base or cap thereof. Figs. 3 and 4 are like views to Fig. 1 of two further forms of reflecting unit in accordance with the invention, and Fig. 5 is a part sectional elevation illustrating the assembly of a number of units in a frame or holder to form a sign.

Referring to the drawing, 7 is a lens having a convex front surface 8 and a plane rear surface 9 behind which is fitted a concaved reflector 10 secured on the lens by a flange or rim 11.

In the device illustrated in Figs. 1 and 2, a cap 12 which may be pressed out of sheet metal in the form of a flat-bottomed cup, is fitted on the rear end of the lens to enclose the reflector 10 and form a base upon which the unit may be stood upright.

The vertical wall or flange 13 of the cap 12 extends beyond the flange or rim 11 of the reflector and has formed in it an annular shoulder 14 against which the reflector bears. The cap may be secured in position by crimping its wall or flange 13 tightly against the periphery of the lens. Preferably, the cap is partly filled with a plastic material 15, such as putty, cement, Paris plaster or the like, and the unit is pressed into the cap until the reflector bears against the annular shoulder 14, the displaced plastic material filling the space between the wall or flange 13 of the cap and the lens, and the plastic material on subsequent setting or hardening serving to secure the cap in position. Recesses 16 may be provided in the shoulder 14 to permit the ready flow of the displaced plastic material from the space below the reflector into the annulus between the periphery of the reflector and the vertical wall or flange 13 of the cap.

The provision of the cap 12 prevents access of dirt and moisture to the reflecting surface of the reflector and damage to the latter by knocks or blows, and also enables the units to be accurately positioned, without the use of external support, while being grouped in a tray-like holder 17, Fig. 5, in which they may be secured by a cement or plastic material 15 which is run into the holder after assembly of the units.

In the modified form of unit shown in Fig. 3 the cap 12 aforesaid is dispensed with and, instead, the rim or flange 11 of the reflector 10 is extended and turned back at 11ª to form a base on which the unit can rest upright. The space below the reflector and between same and the turned back rim or flange 11 is preferably filled with Paris plaster or other suitable material 15.

According to the modification illustrated in Fig. 4, the reflector 10 is made in the form of a cap having a thin rim or flange 11 for clamping on the periphery of the lens and a flat base 18 on which the unit can stand upright.

In all cases the plane rear surface 9 of the lens is preferably ground and polished as it is found that such considerably enhances the reflecting properties of the device and is an improvement over the device as hitherto made in which the said plane surface was unground and unpolished.

What I claim as my invention and desire to secure by Letters Patent is:—

1. A light reflecting device, comprising a cylindrical plano-convex lens the axial length of which is substantially twice the radius of its convex surface, and a concave reflecting surface having a flat outer surface parallel to the plano surface of said lens arranged behind said lens.

2. A light reflecting device, including a cylindrical plano-convex lens the axial length of which is substantially twice the radius of its convex surface, and a cap therefor forming a mounting for said lens having an inner convex reflecting surface and an outer plane surface parallel to the plano surface of said lens.

3. A light-reflecting device or unit of the kind referred to, comprising a cylindrical plano-convex lens, a concave reflecting surface positioned behind the rear surface of the lens and a cap mounted behind said reflecting surface adapted to serve as a protector and a base for the reflector, said cap being in the form of a flat bottom cap enclosing the reflector and having an extending annular wall embracing the periphery of the lens, the cap and reflector being cemented together with a plastic material inserted between the cap and reflector and adapted to subsequently harden.

4. A light-reflecting device or unit of the kind referred to, comprising a cylindrical plano-convex lens, a concave reflecting surface positioned behind the rear surface of the lens and a cap mounted behind said reflecting surface adapted to serve as a protector and a base for the reflector, said cap being in the form of a flat bottom cap enclosing the reflector and having an extending annular wall embracing the periphery of the lens, the cap and reflector being cemented together with a plastic material inserted between the cap and reflector and adapted to subsequently harden, said wall having an annular shoulder intermediate its extremities for engaging said lens.

5. A light-reflecting device or unit of the kind referred to, comprising a cylindrical plano-convex lens, a concave reflecting surface positioned behind the rear surface of the lens and a cap mounted behind said reflecting surface adapted to serve as a protector and a base for the reflector, said cap being in the form of a flat bottom cap enclosing the reflector and having an extending annular wall embracing the periphery of the lens, the cap and reflector being cemented together with a plastic material inserted between the cap and reflector and adapted to subsequently harden, said wall having an annular shoulder intermediate its extremities for engaging said lens, said shoulder having recesses therein adapted to permit insertion of said plastic material between said cap and said reflector.

In witness whereof I have hereunto set my hand.

RICHARD HOLLINS MURRAY.